United States Patent
Fujii

(10) Patent No.: US 6,690,314 B2
(45) Date of Patent: Feb. 10, 2004

(54) REMOTE CONTROLLER KEY CONTINUOUS PRESS DETECTING APPARATUS, REMOTE CONTROLLER KEY CONTINUOUS PRESS DETECTING METHOD AND MEDIUM WITH REMOTE CONTROLLER KEY CONTINUOUS PRESS DETECTING PROGRAM RECORDED THEREON

(75) Inventor: Noriyuki Fujii, Daito (JP)

(73) Assignee: Funai Electric Co., Ltd., Daito (JP)

( * ) Notice: Subject to any disclaimer, the term of this patent is extended or adjusted under 35 U.S.C. 154(b) by 553 days.

(21) Appl. No.: 09/769,486

(22) Filed: Jan. 26, 2001

(65) Prior Publication Data

US 2001/0011955 A1 Aug. 9, 2001

(30) Foreign Application Priority Data

Feb. 3, 2000 (JP) ........................................ 2000-000699

(51) Int. Cl.[7] ........................... G08C 19/12; H04L 17/02
(52) U.S. Cl. .................. 341/176; 340/825.69; 348/734; 359/146
(58) Field of Search ........................ 341/176; 345/169; 359/142, 146; 348/734; 340/825.69, 825.72, 539

(56) References Cited

U.S. PATENT DOCUMENTS

| | | | | | |
|---|---|---|---|---|---|
| 4,796,019 | A | * | 1/1989 | Auerbach | 340/709 |
| 4,814,741 | A | * | 3/1989 | Hongo et al. | 340/825.65 |
| 5,469,152 | A | * | 11/1995 | Yamamoto et al. | 340/825.69 |
| 5,986,358 | A | * | 11/1999 | Hsieh | 307/117 |

FOREIGN PATENT DOCUMENTS

| | | |
|---|---|---|
| JP | 60-247773 | 7/1985 |
| JP | 62-256544 | 11/1987 |
| JP | 7-203565 | 8/1995 |
| JP | 9-50339 | 2/1997 |
| JP | 10-191474 | 7/1998 |
| JP | 11-168779 | 6/1999 |

* cited by examiner

Primary Examiner—Timothy Edwards
(74) Attorney, Agent, or Firm—Crowell & Moring LLP

(57) ABSTRACT

A remote controller key continuous press detecting apparatus and the method thereof that eliminates the impact of noise or the like when the remote controller key is kept pressed continuously to detect the continuously pressed state of the remote controller key and, when the same remote controller key is repeatedly pressed at short intervals, detects the non-continuously pressed state of the remote controller key.

13 Claims, 6 Drawing Sheets

REMOTE CONTROLLER KEY CONTINUOUS PRESS DETECTING APPARATUS, REMOTE CONTROLLER KEY CONTINUOUS PRESS DETECTING METHOD AND MEDIUM WITH REMOTE CONTROLLER KEY CONTINUOUS PRESS DETECTING PROGRAM RECORDED THEREON

BACKGROUND OF THE INVENTION

1. Field of the Invention

The present invention relates to a remote controller key continuous press detecting apparatus, a remote controller key continuous press detecting method and a medium with a remote controller key continuous press detecting program recorded thereon, and more particularly to a remote controller key continuous press detecting apparatus, a remote controller key continuous press detecting method and a medium with a remote controller key continuous press detecting program recorded thereon for detecting, where a remote controller key is kept pressed continuously, the continuously pressed state of the remote controller key of a remote controller which repeatedly supplies a key code at prescribed output intervals.

2. Description of the Prior Art

Known remote controller key continuous press detecting apparatuses according to the prior art include an apparatus which distinguishes at the electrical appliance under its remote control a key code signal supplied from a remote controller and judges whether or not its remote controller key is in a continuously pressed state. This apparatus, when judging whether or not its remote controller key is in a continuously pressed state, determines the presence of such a state if the same key code as the key code previously distinguished is distinguished within a prescribed judgment period. However, if the key code to be distinguished is deformed by noise from another electrical appliance or some other interference, the state may be judged as one of the remote controller key being pressed continuously. As a consequence, even if the user keeps the remote controller key pressed continuously to switch on or off a child lock mode or the like, the continuously pressed state of the remote controller key may not be detected, making the desired switching impossible.

In order to eliminate this inconvenience, it is conceivable to extend the judgment period during which the remote controller key continuous press detecting apparatus judges whether or not the remote controller key is in a continuously pressed state. For instance, where the data length of a key code "A" supplied from the remote controller is 70 ms and the output interval of the key code when the remote controller key is kept pressed continuously is 100 ms, suppose that the judgment period is 280 ms, 2.8 times as long. Then, when the remote controller key is kept pressed continuously, as shown in FIG. 6, even if a key code deformed by noise or the like ("B" in FIG. 6) is once distinguished, if another trial of key code distinguishment is done, the authentic key code ("A" in FIG. 6) can be distinguished. Therefore, the continuously pressed state of the remote controller key will keep on being detected.

The conventional remote controller key continuous press detecting apparatus involves the following problem.

That is, on account of the long judgment period, if the remote controller key is repeatedly pressed at short intervals, it may be mistaken for a state of continuous pressing of this remote controller key. Then, no processing in response to reiterative pressing of this remote controller key cannot take place.

SUMMARY OF THE INVENTION

The present invention, attempted in view of the above-noted problem, is intended to provide a remote controller key continuous press detecting apparatus which eliminates the impact of noise or the like when the remote controller key is kept pressed continuously to detect the continuously pressed state of the remote controller key and, when the same remote controller key is repeatedly pressed at short intervals, detects the non-continuously pressed state of the remote controller key.

A remote controller key continuous press detecting apparatus according to the invention detects the continuously suppressed state of a remote controller which supplies key code repeatedly at prescribed output intervals when the remote controller key is kept pressed continuously, and is provided with: a key code distinguishing unit for distinguishing a key code supplied from the remote controller; a continuous press judging unit for judging a remote controller key continuous press state when it distinguishes the key code distinguished by the key code distinguishing unit at a timing of its predicted arrival when the remote controller key is kept pressed continuously but not immediately judging the end of the remote controller key continuous press state if the key code is not so distinguished; and a detection signal output unit for supplying a continuous press detection signal when the continuous press judging unit has judged the presence of a remote controller key continuous press state.

More specifically, the apparatus is provided with a remote controller light receiving section for receiving infrared ray signals in a pulse waveform generated by a remote controller and converting them into electrical signals; a key code distinguishing circuit, into which the electrical signals supplied from the remote controller light receiving section are entered, for distinguishing a key code according to the combination of the states of the electrical signals; a continuous press judging circuit, into which this distinguished key code is entered, for distinguishing a remote controller key continuous press state when a key code is distinguished at a timing of its predicted arrival when the remote controller key is kept pressed continuously, but not immediately judging the end of the remote controller key continuous press state if the key code is not so distinguished if, after the distinguishment of the key code for detecting the continuously pressed state, the same key code is not distinguished at the timing of its next predicted arrival; and a detection signal output circuit for supplying a continuous press detection signal when the continuous press judging circuit has detected a continuously pressed state.

In this configuration according to the invention, the key code distinguishing unit distinguishes the key code supplied from the remote controller. Then the continuous press judging unit judges whether or not a remote controller key continuous press state is present according to the key code distinguished by the key code distinguishing unit, and the detection signal output unit supplies a continuous press detection signal if the continuous press judging unit judges the presence of a remote controller key continuous press state.

As the key code is repeatedly supplied from the remote controller at prescribed output intervals when the remote controller key is kept pressed continuously, the arrival timing of the key code for continuous pressing of the remote controller key can be foreseen. Therefore, the continuous press judging unit, if the key code is distinguished at a timing when continuous pressing of the remote controller key is expected, judges the presence of a remote controller key continuous press state. On the other hand, if no key code is distinguished at its predicted timing of arrival, it does not immediately judge that the remote controller key continuous press state has ended. Thus, even if the key code is temporarily deformed by noise or the like when the remote controller key is kept pressed continuously, the judgment of the presence of a remote controller key continuous press state is maintained at the time, with the result that the remote controller key continuous press state continues to be detected.

Incidentally, if the remote controller key continuous press state is judged to have ended only when no key code is entered at the timing of its predicted arrival, a remote controller key continuous press state is more likely than not to be judged present if the remote controller key is repeatedly pressed at short intervals. On the other hand, if it is so arranged that distinguishment of a different key code from what is used for detecting a continuously pressed state at the timing of the anticipated arrival of the detection key code would forbid judgment of the end of the key code remote controller key continuous press state until the next timing of the anticipated arrival, the remote controller key continuous press state will continue to be detected. Therefore, it is made possible to eliminate the impact of noise or the like when the remote controller key is kept pressed continuously to enable the remote controller key continuous press state to be detected and, at the same time, not to mistake the repeated pressing of the same remote controller key at short intervals for a remote controller key continuous press state thereby to achieve correct detection.

As described above, the invention can provide a remote controller key continuous press detecting apparatus capable of detecting a remote controller key continuous press state without being affected by noise or the like when the remote controller key is kept pressed continuously, and detecting repeated pressing of the same remote controller key at short intervals as such without mistaking it for a remote controller key continuous press state.

Here it is sufficient for the continuous press judging unit not to immediately judge that the remote controller key continuous press state has ended if no key code is distinguished at the timing of its predicted arrival when the remote controller key is kept pressed continuously. As a specific example of this function, there can be adopted a configuration in which the continuous press judging unit judges the presence of a remote controller key continuous press state when the same key code as what was distinguished by the key code distinguishing unit last time is distinguished within a prescribed first judgment period and, if a different key code from what was distinguished previously is distinguished, also judges the presence of a remote controller key continuous press state if the same key code as what was distinguished last time is distinguished within a prescribed second judgment period from the time the different key code was distinguished.

In this configuration, the continuous press judging unit key code distinguishing unit judges the presence of a remote controller key continuous press state when the same key code as what was distinguished last time is distinguished within the prescribed first judgment period. On the other hand, if a different key code from what was distinguished previously is distinguished, it also judges the presence of a remote controller key continuous press state if the same key code as what was distinguished last time is distinguished within the prescribed second judgment period from the time the different key code was distinguished. Then, even if the key code is deformed by noise or the like when the remote controller key is kept pressed continuously, the presence of a remote controller key continuous press state is judged if the key code for detecting the continuously pressed state is distinguished afterwards within the second judgment period. Therefore, the remote controller key continuous press state continues to be detected.

This configuration makes it possible to provide a specific remote controller key continuous press detecting apparatus capable of detecting a remote controller key continuous press state when the remote controller key is kept pressed continuously without being affected by the impacts of noise or the like.

Here, different combinations of the first judgment period and the second judgment period are conceivable if there is an opportunity to distinguish the key code of the remote controller key which has been pressed continuously at least once in each judgment period. In one specific example, the first judgment period and the second judgment period of the continuous press judging unit are as long, and they can be longer than each output interval of the key code when the remote controller key is kept pressed continuously and shorter than twice that interval.

In this configuration, the first judgment period and the second judgment period of the continuous press judging unit are equalized, and the first judgment period and the second judgment period are longer than each output interval of the key code when the remote controller key is kept pressed continuously and shorter than twice that interval.

Thus, as the two judgment periods are equal, the configuration of the continuous press judging unit is simplified. Furthermore, as the key code can be distinguished once in each judgment period, the judgment periods are prevented from becoming too long, and the repeated pressing of the same remote controller key at short intervals would not invite erroneous judgment of a remote controller key continuous press state.

Since this configuration prevents the judgment periods from becoming too long, and the repeated pressing of the same remote controller key at short intervals would not be mistaken for a remote controller key continuous press state.

The remote controller key for detecting the continuously pressed state here may be in any desired form, but if it permits detection of remote controller key continuous press state when the power supply to the apparatus it serves is off, the key can be applied to various functions. As an example of such other application, it is conceivable to so configure the continuous press judging unit as to be able to judge a remote controller key continuous press state of the power supply key of the remote controller.

In this configuration, this remote controller key continuous press detecting apparatus can detect the continuously pressed state of the power supply key of the remote controller. Since the key code of the power supply key of the remote controller is distinguished irrespective of the power supply on the part of the apparatus served by this detecting apparatus, its remote controller key continuous press state can be detected even if the power supply to it is turned off.

The continuous press detection signal supplied from the remote controller key continuous press detecting apparatus can be used by a main control unit or the like provided on the part of the apparatus it serves. It is of course possible to incorporate this remote controller key continuous press detecting apparatus into the same element as the main control unit, and in this case the continuous press detection signal can be used within that element.

This configuration makes it possible to detect a remote controller key continuous press state even if the power supply to the apparatus served by the detection apparatus is off.

If in this remote controller key continuous press detecting apparatus here it is possible to generate a signal to validate or invalidate the remote controller key, it will be used for the main control unit or the like in controlling the locking function or the like of the remote controller key. As an example of such application, the remote controller key continuous press detecting apparatus can have a configuration having a control signal output unit which supplies a remote controller key control signal to invalidate or validate the remote controller key if the continuous press detection signal supplied from the detection signal output unit is continued for a prescribed duration.

In this configuration, the control signal output unit generates and supplies a remote controller key control signal to invalidate or validate the remote controller key, and it is made possible, when the remote controller key control signal is switched, to perform control to invalidate or validate the remote controller key and to lock or unlock the remote controller key.

Thus, control to invalidate or validate the remote controller key is facilitated.

DESCRIPTION OF THE PREFERRED EMBODIMENT

A preferred embodiment of the preferred embodiment of the present invention will be described with reference to accompanying drawings.

Figure 1:
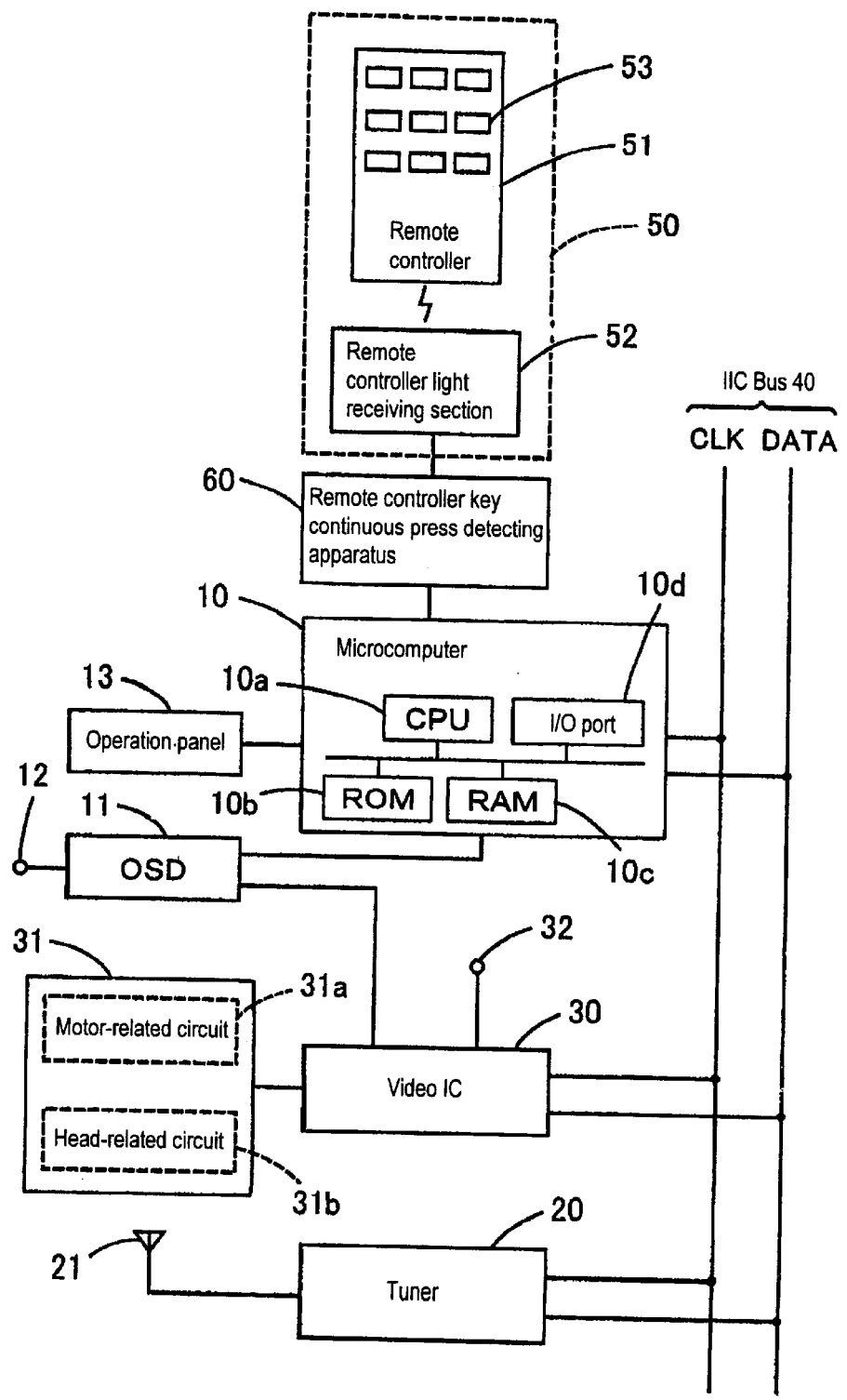
FIG. 1 is a schematic block diagram of a video apparatus to which a remote controller key continuous press detecting apparatus, which is a preferred embodiment of the present invention, is applied.

FIG. 1 is a schematic block diagram of a video apparatus to which a remote controller key continuous press detecting apparatus, which is the preferred embodiment of the present invention, is applied.

Referring to the diagram, to an IIC bus 40 are connected a microcomputer 10 which is a main control unit for centrally controlling internal units; a tuner 20 for receiving television broadcast waves; and a video IC 30 for restoring video signals and audio signals on the basis of received television broadcast waves and supplying them to high voltage circuits and audio amplifying circuits (not shown). These circuits perform prescribed data communication in a serial data formula via the IIC bus 40. As the microcomputer 10 controls the whole system by this serial data communication, the system functions as a video apparatus. Within the microcomputer 10, there are provided a CPU 10a for executing various judgments, a ROM 10b in which programs and data are written, a RAM 10c used for temporary storage of variables and the like, and an I/O port 10d for exchanging control signals and the like with external units.

The tuner 20 is a tuner using a so-called voltage synthesizer, and can be controlled via the IIC bus 40. An ordinary tuner is provided with a potentiometer for a tuned voltage (V0) and a band selector switch for the VHF low band (VL), the VHF high band (VH) and the UHF (U), and receives signals corresponding to the frequency of the desired channel by appropriately setting these constituent units. Unlike it, this tuner 20 includes no such mechanical constituents, but receives these setpoints from the microcomputer 10 via the IIC bus 40, and receives television broadcast signals of a receive frequency matching these setpoints via an antenna 21. At the same time, it generates intermediate frequency signals from the television broadcast signals, and supplies them to the video IC 30.

The video IC 30, when supplied with intermediate frequency signals generated by the tuner 20, subjects the intermediate frequency signals to various ways of signal processing in accordance with a control instruction from the microcomputer 10 and supplies the processed signals. Then, while causing a motor-related circuit 31a to run a videotape in accordance with output signals from various sensors (not shown) arranged in a video mechanism 31, causes a head-related circuit 31b to record the signals on the recording face of the tape.

On the other hand, in playing back, the video IC 30, while causing the motor-related circuit 31a to run the videotape in accordance with a control instruction from the microcomputer 10, causes the head-related circuit 31b to read video signals out of the recording face of the tape. Then, by subjecting these video signals to prescribed signal processing, restores the video signals and audio signals. The video signals from the video IC 30 are supplied to an on-screen display circuit 11, and further supplied to an external monitor or the like via a video output terminal 12. The audio signals from the video IC 30 are supplied to an external loudspeaker or the like via an audio output terminal 32.

To the microcomputer 10 are directly connected an operation panel 13 and an on-screen display circuit 11 connected to the video IC 30. It is also connected to a remote controller system 50 via a remote controller key continuous press detecting apparatus 60. The on-screen display circuit 11, in accordance with the user's operation through the operation panel 13 or the remote controller system 50, supplies to an external CRT monitor or the like display signals from the microcomputer 10, superposed over video signals from the video IC 30. Therefore the user can perform prescribed operations, such as timed setting of recording, in accordance with a display on the external CRT monitor.

The remote controller system 50 consists of a remote controller 51 provided with a plurality of remote controller keys 53 and a remote controller light receiving section 52 for receiving infrared ray signals transmitted from the remote controller 51. The remote controller 51 transmits a key code matching the remote controller key 53 as an infrared ray signal in a pulse waveform. When the remote controller key 53 is kept pressed continuously, the infrared ray signal is repeatedly transmitted at prescribed output intervals. These output intervals of the key code are set longer each than the data length. The transmitted infrared ray signal is received by the remote controller light receiving section 52, and converted into an electrical signal consisting of a combination of "0" and "1". The converted electrical signal is entered into the remote controller key continuous press detecting apparatus 60 and, after it is subjected to prescribed processing, the processed signal is supplied from the remote controller key continuous press detecting apparatus 60 to the microcomputer 10, which is the main control unit.

Figure 2:
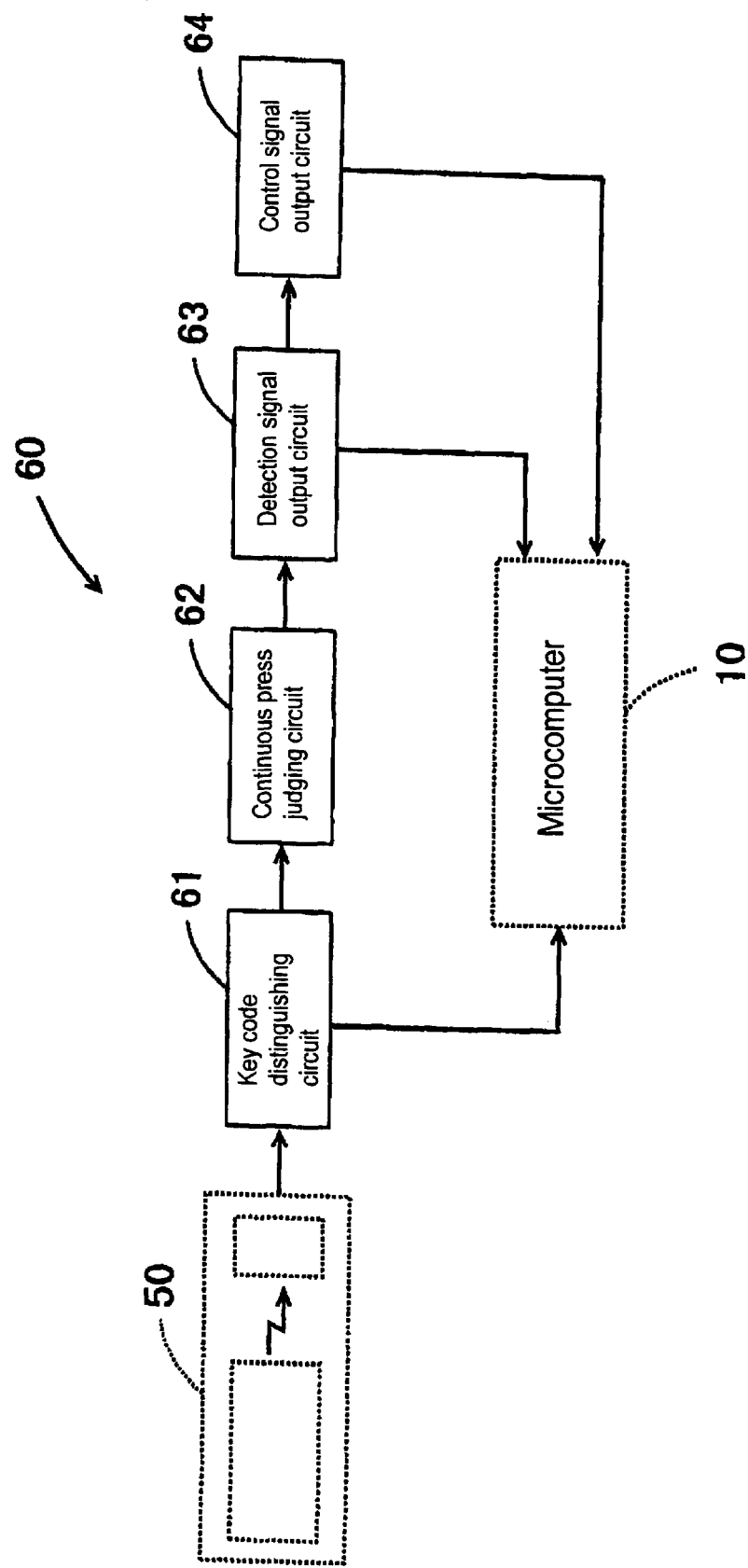
FIG. 2 is a schematic block diagram of a remote controller key continuous press detecting apparatus, which is a preferred embodiment of the invention.

The electrical signal supplied from the remote controller light receiving section 52, as shown in FIG. 2, is entered into a key code distinguishing circuit 61 of the remote controller key continuous press detecting apparatus 60. In the key code distinguishing circuit 61, the key code of the remote controller key 53 that was pressed is distinguished from the combination of "0" and "1" of the electrical signal. The distinguished key code is supplied to a continuous press judging circuit 62 as well as to the microcomputer 10, which is the main control unit, and after it goes through processing according to the key code, various operations and setting are performed in the video apparatus.

In the continuous press judging circuit 62, the presence or absence of a remote controller key continuous press state is judged from the key code distinguished by the key code distinguishing circuit 61. If the key code to be distinguished by the key code distinguishing circuit 61 is distinguished at the timing of its expected arrival when the remote controller key is kept pressed continuously, the presence of a remote controller key continuous press state is judged. For instance, in a remote controller supplying a key code of 70 ms in data length is supplied at 100 ms intervals when the remote controller key is kept pressed continuously, it is 100 ms later when the remote controller key is kept pressed continuously that, after a key code for continuously pressed state detection is distinguished, the same key code is distinguished next. Then the presence of a remote controller key continuous press state can be judged if the key code for continuously pressed state detection is distinguished 100 ms afterwards.

Figure 3:
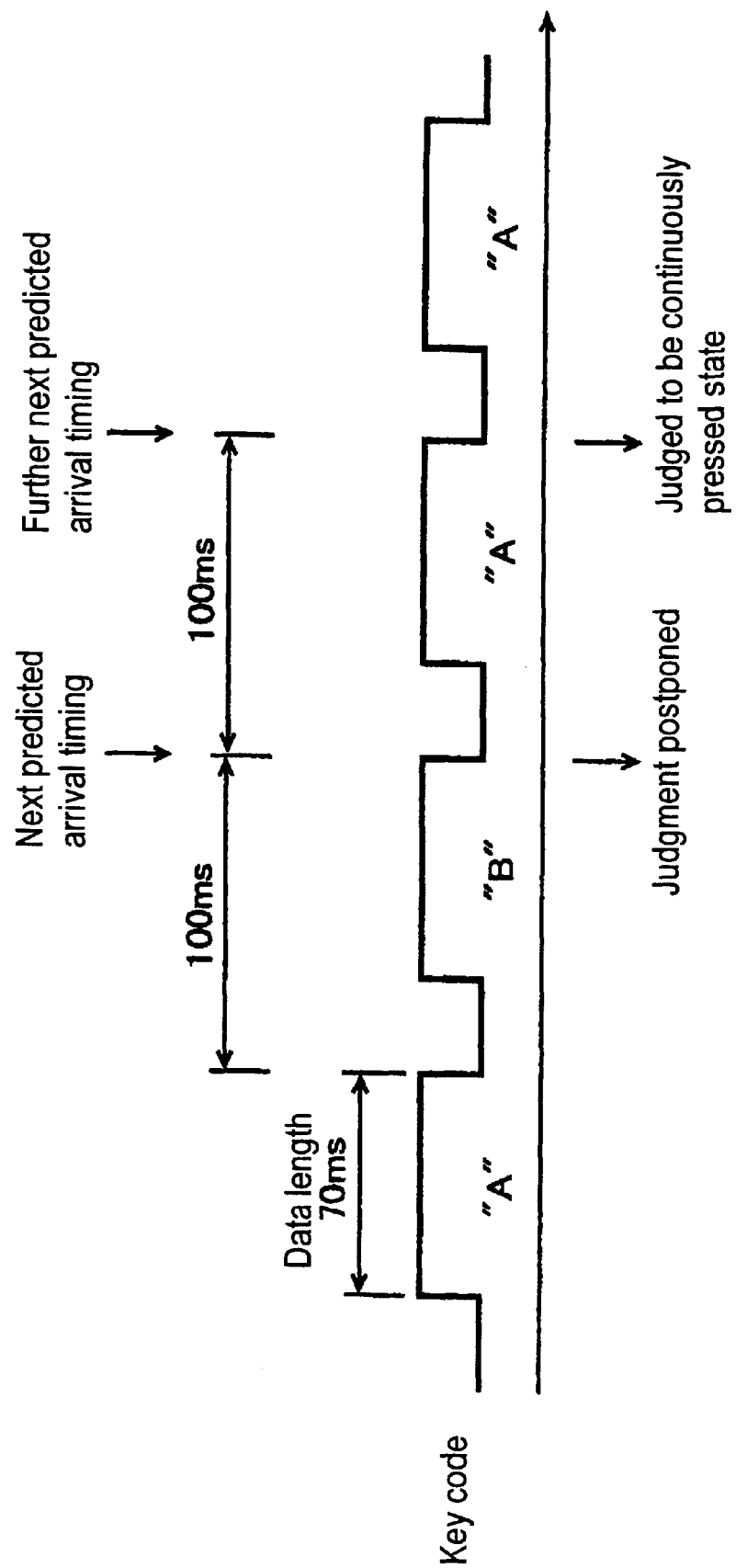
FIG. 3 illustrates the processing which takes place when a remote controller key continuous press state is detected.

Or, if the same key code is not distinguished at the next timing of expected arrival after the key code for continuously pressed state detection is distinguished, the end of the remote controller key continuous press state is not immediately judged, but the judgment is put off. In this case, it can be seen, for instance, whether or not the key code for continuously pressed state detection is distinguished 100 ms afterwards, the next timing of expected arrival. Then, even if the key code for continuously pressed state detection, i.e. the key code "A" has been temporarily deformed to a key code "B" by noise or the like, the remote controller key continuous press state will continue to be detected because, as shown in FIG. 3, the judgment was postponed at the time the key code "A" failed to be distinguished.

When the continuous press judging circuit 62 judges the presence of a remote controller key continuous press state, the detection signal output circuit 63 supplies a continuous press detection signal. This continuous press detection signal is supplied to the microcomputer 10, which is the main control unit, and undergoes processing matching the continuous pressing.

Whereas the remote controller key continuous press detecting apparatus 60 is thus a circuit configured to pass prescribed judgments, its specific processing will be described with reference to the flow chart of FIG. 4 to facilitate understanding. In this case, the continuous press judging circuit 62 judges the presence of a remote controller key continuous press state if the same key code as what was distinguished by the key code distinguishing circuit 61 last time is distinguished within the prescribed first judgment period from the previous occasion. Or, if a different key code is distinguished, it also judges the presence of a remote controller key continuous press state if the same key code as the key code for continuously pressed state detection is distinguished within the prescribed second judgment period from the time the different key code was distinguished.

Various combinations are conceivable here for the first judgment period and the second judgment period if there is an opportunity to distinguish the key code of the remote controller key which has been pressed continuously at least once in each judgment period. For example, if the first judgment period is set to be 1.4 times as long as a key code output interval when the remote controller key is kept pressed continuously, and the second judgment period, 2.4 times as long as the output interval, there will be one opportunity within the first judgment period and a maximum of twice in the second judgment period when the remote controller key is kept pressed continuously. As in this case there are three opportunities (1+2=3) for the key code to be distinguished until the end of the remote controller key continuous press state is judged, even if the key code is deformed twice consecutively by noise or the like, the presence of the remote controller key continuous press state continues to be judged.

Figure 4:
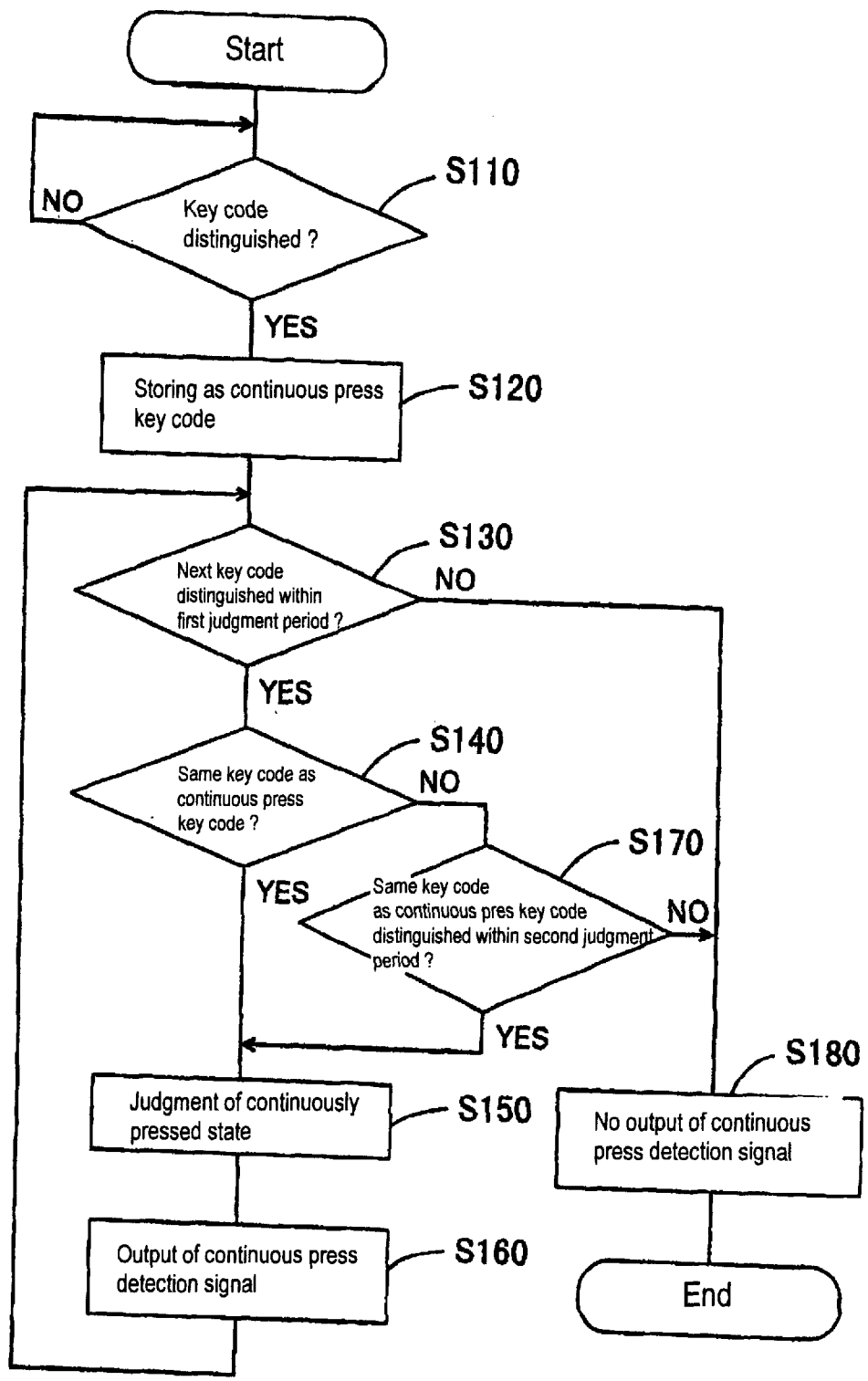
FIG. 4 is a flow chart showing the processing to detect the remote controller key continuous press state.

In the flow shown in FIG. 4, this remote controller key continuous press detecting apparatus first sees whether or not a key code is distinguished by the key code distinguishing circuit 61 (step S110). If no key code is distinguished, step S110 is repeated until a key code is distinguished and, when a key code is distinguished, that key code is stored as the continuous press key code (step S120).

Then, it is seen whether or not the next key code is distinguished within the first judgment period (step S130). If no key code is distinguished within the first judgment period, the presence of a state in which the remote controller key is not kept pressed continuously is judged, and the process goes ahead to step S180. Then, the detection signal output circuit 63 moves to the end of, and goes out of, this flow without supplying a continuous press detection signal. Therefore, if the same remote controller key is repeatedly pressed at short intervals, the next key code will not be distinguished within the first judgment period, and accordingly this flow is followed, with no output of the continuous press detection signal.

To add, after the end of this flow, this flow is repeated to detect a remote controller key continuous press state.

If a key code is distinguished within the first judgment period, it is checked whether or not it is the same key code as the continuous press key code (step S140). If it is found to be the same key code, this means that a key code for continuously pressed state detection has been distinguished at the timing of its expected arrival, the presence of a continuously pressed state is judged (step S150), and a continuous press detection signal is supplied from the detection signal output circuit 63, and the process returns to step S130 to continue detection of a continuously pressed state.

Or if a different key code from the continuous press key code is distinguished within the first judgment period, it is checked whether or not the same key code as the continuous press key code is distinguished within the second judgment period from the time this different key code was (step S170). If the same key code as the continuous press key code is distinguished the process goes ahead to step S150, and the presence of a continuously pressed state is judged. Thus, even if the key code for continuously pressed state detection is temporarily deformed by noise or the like, this processing causes the remote controller key continuous press state to continue to be detected.

To add, if the same key code as the continuous press key code is not distinguished at step S170, the presence of a state in which the remote controller key is not kept pressed continuously is judged, and the detection signal output circuit 63 does not supply a continuous press detection signal (step S180) moves to the end of, and goes out of, this flow.

Thus, this remote controller key continuous press detecting apparatus 60 can judge the continuous pressing of the remote controller key in a prescribed procedure, and it can evidently provide an effective remote controller key continuous press detecting method. It is also possible to execute these actions within the microcomputer 10, and in that case, a program corresponding to the flow chart shown in FIG. 4 can be written into the ROM 10b in the microcomputer 10 to be executed by the CPU 10a. In this configuration, the ROM 10b serves as a medium with a remote controller key continuous press detecting program recorded thereon. It goes without saying that it can be applied to various media on which a program can be recorded, and where a flash ROM or the like is provided, the contents can be rewritten as appropriate for recording.

As described so far, the remote controller key continuous press detecting apparatus 60, comprising the aforementioned key code distinguishing circuit 61, continuous press judging circuit 62 and detection signal output circuit 63, detects a remote controller key continuous press state with an electrical signal supplied from the remote controller system 50, and can supply a continuous press detection signal to the microcomputer 10, which is the main control unit. In doing so, even if the key code for continuously pressed state detection is temporarily deformed by noise or the like, the continuous press detection signal will continue to be supplied and, if the remote controller key is repeatedly pressed at short intervals, the continuous press detection signal will be prevented from being supplied.

Incidentally in this embodiment, with a view to facilitating the performance of a child lock function, a control signal output circuit 64 is provided. Into the control signal output circuit 64 is entered the continuous press detection signal supplied from the detection signal output circuit 63. If the continuous press detection signal continues for a prescribed duration, a remote controller key control signal to invalidate or validate the remote controller key is supplied. This remote controller key control signal is entered into the microcomputer 10 to enable processing to invalidate or validate the remote controller key to be executed.

Described below is an example to realize the child lock function to invalidate or validate every remote controller key by applying the remote controller key continuous press detecting apparatus, which is a preferred embodiment of the invention. Incidentally, the child lock function is intended for protection from children's mischief, and is required irrespective of whether the power supply to the video apparatus itself is on or off. Furthermore, to prevent the child lock mode from being readily cancelled or actuated, every remote controller key is invalidated (child lock on) or validated (child lock off) by keeping the power supply key of the remote controller pressed continuously for five seconds. The duration of the key pressing to turn on or off the child lock is satisfactory if it is perceived to be very long, and can be set either longer or shorter than five seconds.

Figure 5:
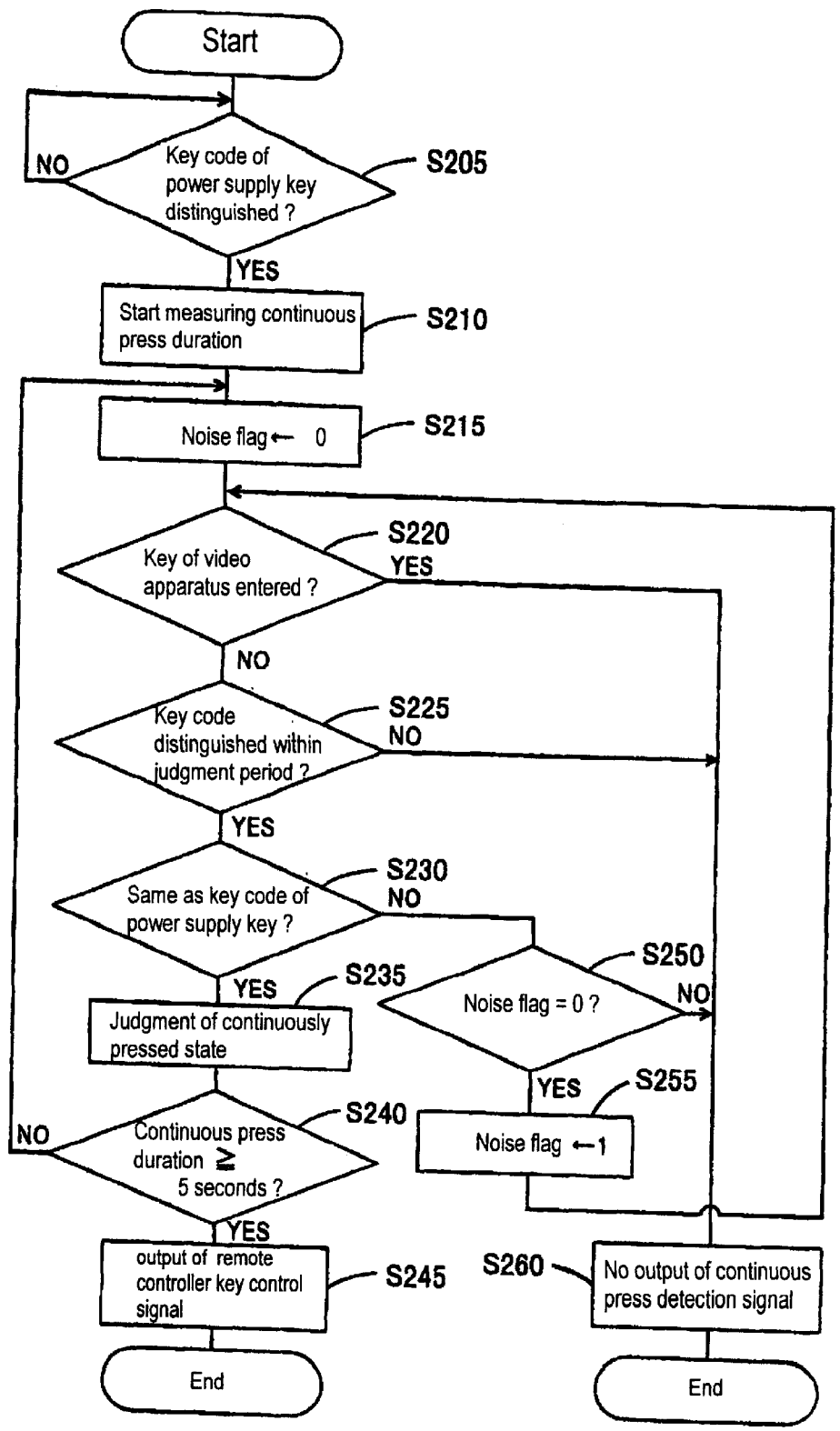
FIG. 5 is a flow chart showing the processing of a child lock function.
Figure 6:
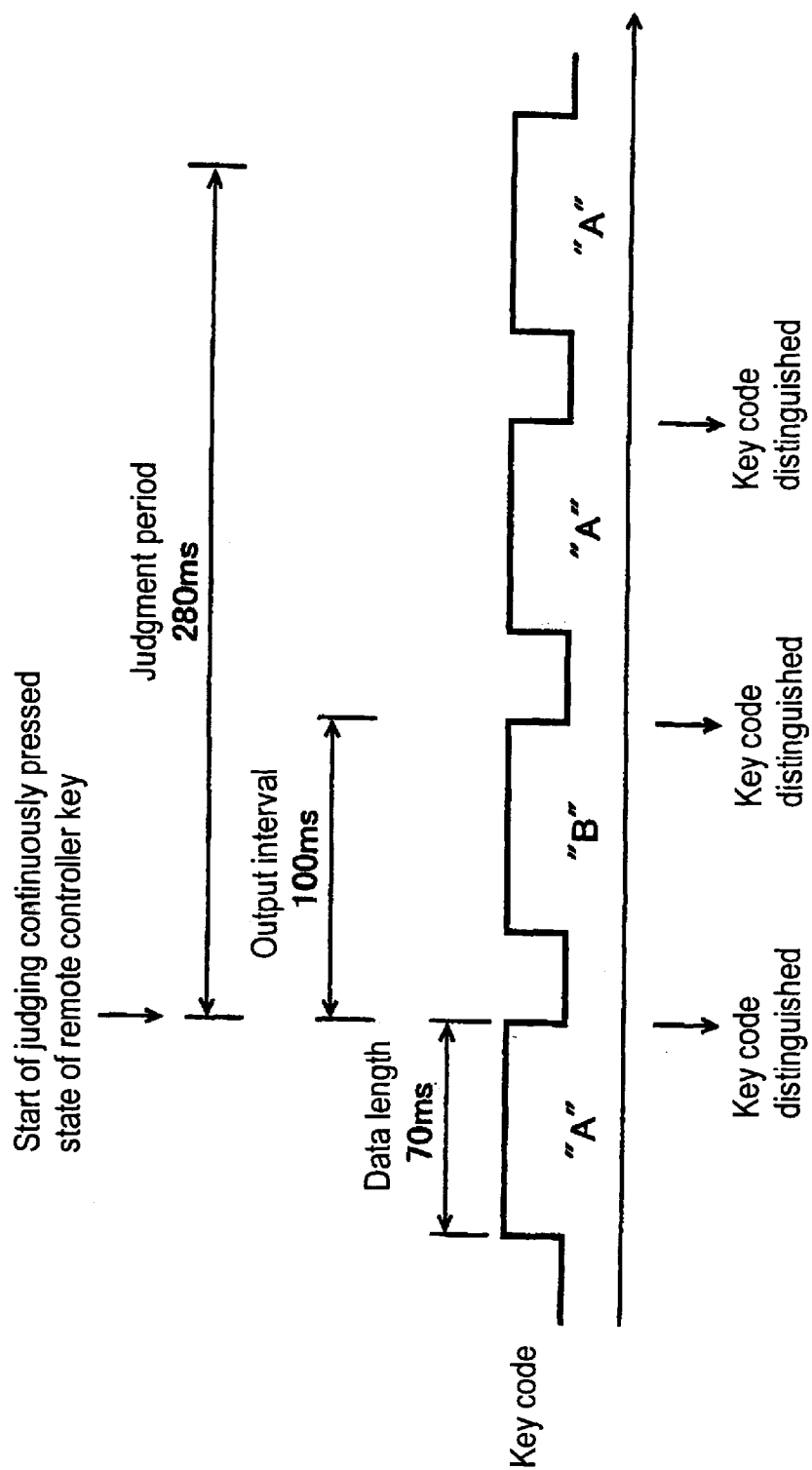
FIG. 6 illustrates the relationship between the key code output interval and the judgment period at the time of remote controller key continuous pressing.

FIG. 5 is a flow chart showing the processing of the child lock function to which the remote controller key continuous press detecting apparatus, which is a preferred embodiment of the invention, is applied. Since the remote controller key for detecting a continuously pressed state here is a power supply key, the processing at step 120 of FIG. 4 to store it as a continuous press key code is not performed. Further, the first judgment period and the second judgment period for the continuous press judging circuit 62 are equally 140 ms long. Equalizing the first judgment period and the second judgment period enables common processing to be done at steps S130, S140 and S170 of FIG. 4. Incidentally, the key code output interval when the power supply key is kept pressed continuously is 100 ms, enabling the key code when the power supply key is kept pressed continuously to be distinguished within the judgment period.

Referring to FIG. 5, first it is checked whether or not the key code of the remote controller power supply key has been distinguished at the key code distinguishing circuit 61 (step S205). If the key code of the power supply key has not been distinguished, step S205 is repeated until that key code is distinguished. Once the key code is distinguished, the duration of the continuous pressing of the power supply key begins to be measured (step S210).

After that, a noise flag to distinguish whether the judgment period for the continuous press judging circuit 62 is the first judgment period or the second judgment period is set to "0" (step S215). When this noise flag is "0", it is judged to be the first judgment period, or when the noise flag is "1", it is judged to be the second judgement period, and the processing is performed accordingly. Next it is checked whether or not the key of the operation panel 13 of the video apparatus itself has been entered (step S220). This is intended to suspend the detection of a remote controller power supply key continuously pressed state if any key of the video apparatus has been manipulated. In this case no continuous press detection signal is supplied (step S260), and the process will move ahead to the end of, and go out of, this flow.

If no key of the video apparatus is found operated, it is checked if the key code of the remote controller key has been distinguished within the judgment period (step S225). If the key code has not been distinguished within the judgment period, it is judged that the remote controller key is not kept pressed continuously, and no continuous press detection signal is supplied (step S260), the process moving to the end of, and going out of, this flow.

To add, even if it is tried to press the remote controller power supply key repeatedly at short intervals, it is practically impossible to press it repeatedly within the 140 ms of the judgment period, and the key code is not distinguished at step S225 within the judgment period, so that the presence of a remote controller power supply key continuously pressed state is not judged.

If the key code has been distinguished within the judgment period, it is checked whether or not that key code is the same as that of the power supply key (step S230). If it is the key code of the power supply key, the presence of a continuously pressed state is judged (step S235). Then the continuous press detection signal supplied from the detection signal output circuit 63 is entered into the control signal output circuit 64, and it is checked if the duration of the continuous pressing of the power supply key in the control signal output circuit 64 is not less than five seconds (step S240). If it is less than five seconds, the process goes back to step S215 to continue the detection of the continuously pressed state. If it is not less than five seconds, the remote controller key control signal is supplied from the control signal output circuit 64 (step S245), and the process will move ahead to the end of, and go out of, this flow. As this remote controller key control signal is entered into the microcomputer 10, control to invalidate or validate every remote controller key is carried out.

If at step S230a different key code from the power supply key is distinguished within the judgment period, it is checked whether or not the noise flag is "0" (step S250). If the noise flag is "0", this judgment period is the first judgment period, so that processing not to judge that the remote controller power supply key continuously pressed state has ended is performed. Thus, the noise flag is set to "1" (step S255), and the processing from step S220 through step S230 is repeated. If the key code of the power supply key is distinguished at step S230 within the judgment period, the presence of a continuously pressed state is judged (step S235). Or if a different key code from the power supply key us distinguished at step S230, then the noise flag is "1" this time. Since this means that the processing at step S230 was done within the second judgment period, no continuous press detection signal is supplied (step S260), and the process moves ahead to the end of, and goes out of, this flow.

In this way, even if the key code temporarily varies when the remote controller power supply key is kept pressed continuously, the remote controller power supply key continuously pressed state is not ended, and the processing of the child lock function takes place in the video apparatus.

As hitherto described, the use of this remote controller key continuous press detecting apparatus facilitates realization of the child lock function and the like. On that occasion, even if a different key code from the remote controller key for continuously pressed state detection is distinguished within the judgment period, it is not immediately judged that the remote controller key continuous press state has ended. Therefore, even if the key code is temporarily deformed by noise or the like, the remote controller key continuous press state is maintained. Or, if the remote controller key is repeatedly pressed at short intervals, the presence of a remote controller key continuous press state is not judged. Therefore, there can be provided a remote controller key continuous press detecting apparatus capable of eliminating the impacts of noise and the like when the remote controller key is kept pressed continuously and detecting a remote controller key continuous press state, and when the remote controller key is repeatedly pressed at short intervals, it can be detected as such instead of being mistaken for a remote controller key continuous press state.

What is claimed is:

1. A remote controller key continuous press detecting apparatus for detecting the remote controller key continuous press state of a remote controller which supplies a key code repeatedly at prescribed output intervals when a remote controller key is kept pressed continuously, said apparatus being provided with:

a key code distinguishing unit for distinguishing a key code supplied from said remote controller;

a continuous press judging unit for distinguishing a remote controller key continuous press state when a key code distinguished by the key code distinguishing unit is distinguished at a timing of its predicted arrival when the remote controller key is kept pressed continuously, and not immediately judging the end of the remote controller key continuous press state if the key code is not so distinguished; and a detection signal output unit for supplying a continuous press detection signal when the continuous press judging unit has detected a remote controller key continuous press state.

2. A remote controller key continuous press detecting apparatus, as claimed in claim 1 provided with:

a control signal output unit for supplying a remote controller key control signal to invalidate or validate the remote controller key when the continuous press detection signal supplied from said detection signal output unit continues for a prescribed duration.

3. A remote controller key continuous press detecting apparatus, as claimed in claim 1, wherein:

said continuous press judging unit judges the presence of a remote controller key continuous press state when the same key code as what was distinguished by said key code distinguishing unit last time is distinguished within a prescribed first judgment period and, if a different key code from what was distinguished previously is distinguished, also judges the presence of a remote controller key continuous press state if said same key code as what was distinguished last time is distinguished within a prescribed second judgment period from the time the different key code was distinguished.

4. A remote controller key continuous press detecting apparatus, as claimed in claim 3, wherein:

said continuous press judging unit judges the remote controller key continuous press state of the power supply key of the remote controller.

5. A remote controller key continuous press detecting apparatus, as claimed in claim 3, provided with:

a control signal output unit for supplying a remote controller key control signal to invalidate or validate the remote controller key when the continuous press detection signal supplied from said detection signal output unit continues for a prescribed duration.

6. A remote controller key continuous press detecting apparatus, as claimed in claim 3, wherein:

the first judgment period and the second judgment period of said continuous press judging unit are equally long; and these first judgment period and second judgment period are longer than each output interval of the key code when the remote controller key is kept pressed continuously and shorter than twice that interval.

7. A remote controller key continuous press detecting apparatus, as claimed in claim 6, wherein:

said continuous press judging unit judges the remote controller key continuous press state of the power supply key of the remote controller.

8. A remote controller key continuous press detecting apparatus, as claimed in claim 6, provided with:

a control signal output unit for supplying a remote controller key control signal to invalidate or validate the remote controller key when the continuous press detection signal supplied from said detection signal output unit continues for a prescribed duration.

9. A remote controller key continuous press detecting apparatus, as claimed in claim 1 wherein:

said continuous press judging unit judges the remote controller key continuous press state of the power supply key of the remote controller.

10. A remote controller key continuous press detecting apparatus, as claimed in claim 9, provided with:

a control signal output unit for supplying a remote controller key control signal to invalidate or validate the remote controller key when the continuous press detection signal supplied from said detection signal output unit continues for a prescribed duration.

11. A remote controller key continuous press detecting apparatus provided with a remote controller light receiving section for receiving infrared ray signals in a pulse waveform generated by a remote controller and converting them into electrical signals;

a key code distinguishing circuit, into which the electrical signals supplied from the remote controller light receiving section are entered, for distinguishing a key code according to the combination of the states of the electrical signals;

a continuous press judging circuit, into which this distinguished key code is entered, for distinguishing a remote controller key continuous press state when a key code is distinguished at a timing of its predicted arrival when the remote controller key is kept pressed continuously, but not immediately judging the end of the remote controller key continuous press state if the key code is not so distinguished if, after the distinguishment of the key code for detecting the continuously pressed state, the same key code is not distinguished at the timing of its next predicted arrival; and a detection signal output circuit for supplying a continuous press detection signal when the continuous press judging circuit has detected a continuously pressed state.

12. A remote controller key continuous press detecting method for detecting the remote controller key continuous press state of a remote controller which supplies a key code repeatedly at prescribed output intervals when a remote controller key is kept pressed continuously, said method executing:

a key code distinguishing step to distinguish a key code supplied from said remote controller; and a continuous press judging step to distinguish a remote controller key continuous press state when a key code distinguished at the key code distinguishing step is distinguished at a timing of its predicted arrival when the remote controller key is kept pressed continuously, and not to immediately judge the end of the remote controller key continuous press state if the key code is not so distinguished.

13. A medium with a remote controller key continuous press detecting program recorded thereon for detecting the remote controller key continuous press state of a remote controller which supplies a key code repeatedly at prescribed output intervals when a remote controller key is kept pressed continuously, said program causing a computer to execute:

a key code distinguishing step to distinguish a key code supplied from said remote controller; and a continuous press judging step to distinguish a remote controller key continuous press state when a key code distinguished at the key code distinguishing step is distinguished at a timing of its predicted arrival when the remote controller key is kept pressed continuously, and not to immediately judge the end of the remote controller key continuous press state if the key code is not so distinguished.

* * * * *